US010482404B2

(12) United States Patent
Theebaprakasam et al.

(10) Patent No.: US 10,482,404 B2
(45) Date of Patent: Nov. 19, 2019

(54) DELEGATED PRIVILEGED ACCESS GRANTS

(71) Applicant: Oracle International Corporation, Redwood Shores, CA (US)

(72) Inventors: Arun Theebaprakasam, Fremont, CA (US); Kuang-Yu Shih, Fremont, CA (US); Zhe Wang, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 577 days.

(21) Appl. No.: 14/819,970

(22) Filed: Aug. 6, 2015

(65) Prior Publication Data

US 2016/0092802 A1 Mar. 31, 2016

Related U.S. Application Data

(60) Provisional application No. 62/055,418, filed on Sep. 25, 2014.

(51) Int. Cl.
*G06Q 10/00* (2012.01)
*G06Q 10/06* (2012.01)

(52) U.S. Cl.
CPC ................ *G06Q 10/0631* (2013.01)

(58) Field of Classification Search
None
See application file for complete search history.

(56) References Cited

U.S. PATENT DOCUMENTS

| 8,141,138 | B2 | 3/2012 | Bhatia et al. |
| 9,185,095 | B1 | 11/2015 | Moritz et al. |
| 9,547,839 | B2 | 1/2017 | Luo et al. |
| 2004/0039704 | A1* | 2/2004 | Gilliam ............... H04L 63/0428 705/50 |

(Continued)

OTHER PUBLICATIONS

Desmond, Brian, Delegating Privileges in Active Directory, Jan. 14, 2011, ITProToday, https://www.itprotoday.com/active-directory/delegating-privileges-active-directory, p. 1-12.*

(Continued)

*Primary Examiner* — Joseph M Waesco
(74) *Attorney, Agent, or Firm* — Kilpatrick Townsend & Stockton LLP

(57) ABSTRACT

A privileged account management system is provided that controls the management and access of resources within the organization. Resources may include target systems and accounts of the organization. In an embodiment, the privileged account management system is configured to enable the creation of one or more resource groups. A resource group includes a subset of a plurality of resources provided by the organization. In certain embodiments, the privileged account management system is configured to define one or more groups of administrative entities within the organization and assign to each administrative entity in a group of administrative entities, a set of privileges on a resource group. In certain embodiments, the privileged account manager system may be configured to enable an administrative entity from a group of administrative entities to delegate a subset of privileges associated with a resource group to a user entity not in the group of administrative entities.

21 Claims, 9 Drawing Sheets

(56) References Cited

U.S. PATENT DOCUMENTS

| | | |
|---|---|---|
| 2004/0083389 A1 | 4/2004 | Yoshida |
| 2005/0138420 A1* | 6/2005 | Sampathkumar ...... G06Q 10/10 726/4 |
| 2005/0203881 A1* | 9/2005 | Sakamoto ............. G06F 21/552 |
| 2007/0074289 A1 | 3/2007 | Maddaloni |
| 2007/0083915 A1* | 4/2007 | Janakiraman ......... G06F 21/316 726/4 |
| 2007/0255818 A1 | 11/2007 | Tanzer et al. |
| 2008/0306872 A1* | 12/2008 | Felsher ................ G06F 19/328 705/51 |
| 2009/0076995 A1 | 3/2009 | Uyama et al. |
| 2009/0293121 A1 | 11/2009 | Bigus et al. |
| 2010/0082513 A1* | 4/2010 | Liu ..................... H04L 63/1458 706/46 |
| 2010/0146622 A1 | 6/2010 | Nordström et al. |
| 2010/0257580 A1 | 10/2010 | Zhao |
| 2010/0299292 A1 | 11/2010 | Collazo |
| 2011/0023115 A1 | 1/2011 | Wright |
| 2011/0296001 A1* | 12/2011 | Ramstrom ............. G06F 21/31 709/224 |
| 2011/0296003 A1* | 12/2011 | McCann ............... G06F 21/316 709/224 |
| 2012/0017281 A1 | 1/2012 | Banerjee et al. |
| 2012/0036245 A1* | 2/2012 | Dare ........................ G06F 8/60 709/223 |
| 2012/0036440 A1* | 2/2012 | Dare ........................ G06F 9/54 715/734 |
| 2012/0036552 A1* | 2/2012 | Dare .................. H04L 41/0253 726/1 |
| 2012/0260339 A1 | 10/2012 | Bhogal et al. |
| 2013/0086060 A1 | 4/2013 | Donley et al. |
| 2013/0298186 A1 | 11/2013 | Radkowski et al. |
| 2014/0040638 A1* | 2/2014 | Barton; Gary .......... H04L 41/00 713/193 |
| 2014/0075492 A1* | 3/2014 | Kapadia ................ H04L 63/102 726/1 |
| 2014/0095894 A1* | 4/2014 | Barton .................... H04L 67/10 713/190 |
| 2014/0096186 A1* | 4/2014 | Barton .................... H04L 67/10 726/1 |
| 2014/0108558 A1* | 4/2014 | Borzycki ............ G06F 21/6218 709/205 |
| 2014/0129268 A1* | 5/2014 | B'Far ............. G06Q 10/063112 705/7.11 |
| 2014/0282586 A1* | 9/2014 | Shear .................... G06F 9/5072 718/104 |
| 2014/0337528 A1* | 11/2014 | Barton .................... H04L 41/00 709/225 |
| 2015/0113600 A1 | 4/2015 | Dulkin et al. |
| 2015/0121461 A1* | 4/2015 | Dulkin ................ H04L 63/1408 726/4 |
| 2015/0180894 A1* | 6/2015 | Sadovsky ............. G06F 3/0481 726/22 |
| 2015/0200821 A1 | 7/2015 | Sade et al. |
| 2015/0261955 A1 | 9/2015 | Huang et al. |
| 2015/0373049 A1 | 12/2015 | Sharma et al. |
| 2016/0094577 A1 | 3/2016 | Shih et al. |
| 2016/0226914 A1* | 8/2016 | Doddy .................... G06F 21/45 |
| 2016/0234198 A1* | 8/2016 | Breiman ............ H04L 63/0815 |

OTHER PUBLICATIONS

U.S. Appl. No. 14/862,906, Non Final Office Action dated Mar. 23, 2017, 11 pages.
U.S. Appl. No. 14/862,906, Final Office Action dated Nov. 16, 2017, 13 pages.
U.S. Appl. No. 14/862,906, Non-Final Office Action dated Oct. 5, 2018, 10 pages.
U.S. Appl. No. 14/862,906, Notice of Allowance dated Aug. 27, 2019, 11 pages.

* cited by examiner

FIG. 6

DELEGATED PRIVILEGED ACCESS GRANTS

CROSS-REFERENCES TO RELATED APPLICATIONS

The present application is a non-provisional application of and claims the benefit and priority under 35 U.S.C. 119(e) of U.S. Provisional Application No. 62/055,418, filed Sep. 25, 2014 entitled "DELEGATED PRIVILEGED ACCESS GRANTS," the entire contents of which are incorporated herein by reference for all purposes.

BACKGROUND OF THE INVENTION

The present disclosure relates generally to techniques for managing resources in an organization. Resources in an organization can include, for example, software products, applications (e.g., cloud-based applications, enterprise applications, or any other applications), cloud services, various types of data (e.g., networked files, directory information, databases, or the like) and other resources. In order to effectively manage access to resources within an organization, an organization may provide administration privileges to user entities of the organization. User entities may include for example, administrative entities such as administrators or end-users of the organization. Typically, administration privileges are provided globally to all administrative entities of an organization to enable access to the resources of the organization. As such, finding improved ways to manage access to available resources within an organization continues to be a priority.

BRIEF SUMMARY OF THE INVENTION

In certain embodiments, techniques are provided (e.g., a method, a system, non-transitory computer-readable medium storing code or instructions executable by one or more processors) for managing the access to resources of an organization. In an embodiment, the resources of an organization may include accounts and target systems of the organization. As used herein, target systems can include, but are not limited to, software products, applications (e.g., cloud-based applications, enterprise applications, or any other applications), cloud services, various types of data (e.g., networked files, directory information, databases, or the like), and other resources. In some embodiments, target systems may include one or more databases, lightweight directory access protocol (LDAP) servers, Active Directory (AD) systems, Email Systems, UNIX systems and the like. For example, a target system may be an Active Directory (AD) system that provides access to active directory services to access an Active Directory server. Resources may include networked files, directory information, or the like of an organization. In some embodiments, resources may include accounts (e.g., user accounts, administrative accounts, and/or application accounts) that enable users of an organization to access or otherwise log in to the target systems.

In certain embodiments, a privileged account management system is disclosed that controls the management and access of resources by user entities of the organization by providing administration privileges to the user entities. User entities may include, for example, administrative entities such as administrators of the organization. In certain embodiments, the privileged account management system may be configured to enable the creation of resource groups. For instance, an administrator of the organization having global administration privileges to access all the resources of the organization may create the resource groups. The creation of resource groups provides administrative entities of the organization administration privileges to access only a subset of the resources of the organization. The creation of resource groups, in accordance with embodiments of the present invention enables the efficient access and management of resources within the organization.

In an embodiment, a resource group may include a subset of all the resources of the organization. In an embodiment, resources in a resource group may include accounts and target systems of the organization. In certain embodiments, resources in a resource group may also include other resource groups, which may in turn include more accounts and target systems. In certain embodiments, the number of resources in a resource group is less than the number of resources in the plurality of resources of the organization.

In certain embodiments, the privileged account manager system may be configured to enable the definition of one or more groups of administrative entities within the organization. In certain embodiments, the privileged account manager system may be configured to enable the assignment to each administrative entity in a first group of administrative entities, a first set of privileges on the first resource group and enable the assignment to each administrative entity in a second group of administrative entities, a second set of privileges on a second resource group. In some examples, the first resource group is different from the second resource group. In some examples, first set of privileges and the second set of privileges may include at least one of security administrator privileges or user manager privileges associated with the first resource group or the second resource group.

In certain embodiments, the privileged account manager system may be configured to enable a first administrative entity from the first group of administrative entities to delegate a subset of the first set of privileges associated with the first resource group to a user entity or a group of user entities not in the first group of administrative entities. Thus, in accordance with some embodiments of the present invention, an administrative entity of the organization is also provided with the ability to delegate a subset of administration privileges to another user entity or a group or user entities of the organization access a subset of resources (i.e., in a resource group) of the organization.

In some embodiments, information related to delegation of the subset of the first set of privileges is stored in a delegation policy. Information related to the delegation may include location-based policies or temporal policies associated with the delegation of the subset of the first set of privileges. In some embodiments, the privileged account manager system may be configured to provide, to the user entity or the group of user entities, access to the resources in the first resource group.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 is an exemplary illustration of a graphical user interface (UI) provided by the privileged account manager system to enable an administrative entity to view and/or modify privileges delegated to a user entity or a group of user entities.

DETAILED DESCRIPTION OF THE INVENTION

Figure 1:
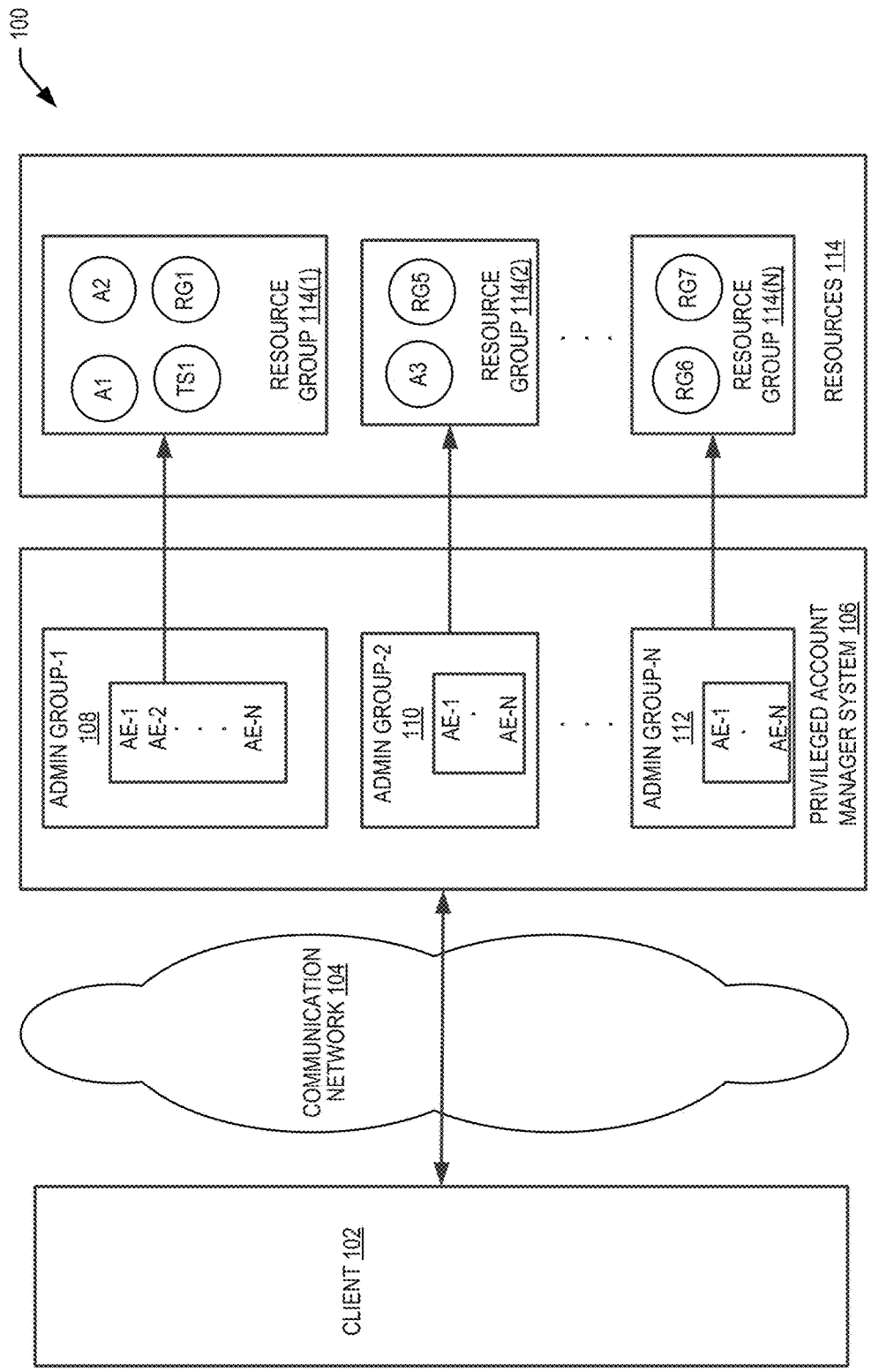
FIG. 1 depicts aspects of an example system architecture 100 for managing resources of an organization in accordance with at least one embodiment of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

Techniques described herein include a method and system for managing access to resources in an organization. In an embodiment, resources may include target systems and accounts of the organization. In some embodiments, a method and system for enabling the creation of resource groups of an organization is provided. A resource group may include a subset of a plurality of resources of the organization. A resource group may also include other resource groups, which may in turn include additional accounts and target systems of the organization. In certain embodiments, the number of resources in any resource group is less than a total number of resources in the plurality of resources of the organization.

In certain embodiments, a privileged account manager system is provided that enables the creation of resource groups within the organization. In certain embodiments, the privileged account manager system may enable the definition of groups of administrative entities within the organization. The definition of administrative entity groups, may, in some embodiments, be based on specific roles of the administrative entities within the organization. For instance, privileged account manager system may be configured to define a 'security' administrative entity group for administrative entities having a security administrator role within the organization, a 'user manager' administrative entity group for administrative entities having a manager role, and so on. In an embodiment, and as discussed above, the creation and/or definition of resource groups may be performed by an administrator of the organization.

In certain embodiments, the privileged account manager system may enable the assignment of a set of privileges on a resource group to each administrative entity of an administrative entity group. For instance, the privileged account manager system may be configured to assign a 'view,' 'change' or a 'reset' privilege on a particular target system in a resource group to entities in a 'security' administrative entity group. Or, for example, privilege assignment component may be configured to assign a 'grant' privilege on an account in a resource group to an entity in a 'user manager' administrative entity group.

In certain embodiments, the privileged account manager system may enable a first administrative entity from a first group of administrative entities to delegate a subset of a first set of privileges associated with a first resource group to a user entity or a group of user entities not in the first group of administrative entities. For instance, a security administrator of a 'security' administrative entity group in an organization may wish to delegate to a user entity or a group of user entities (who is not part of the security' administrative entity group), security administration privileges associated with one or more resources (e.g., LDAP server) in a resource group to enable the user entity access to the LDAP server. In some embodiments, the privileged account manager system may enable the delegation of privileges in accordance with a delegation policy. The delegation policy may specify conditions that can be applied to the delegation of the privileges. These conditions may include, for example, temporal conditions, location conditions and the like that can be applied to the delegation of privileges. For instance, the privileged account manager system may enable the delegation of a set of privileges associated with one or more resources (e.g., LDAP server) in a resource group to a user entity or a group of user entities for only a specific period of time each day, e.g., from 9.00 AM-5.00 PM. Or, for example, the privilege delegation component may enable the delegation of a set of privileges associated with one or more resources (e.g., LDAP server) in a resource group to a user entity or a group of user entities only if the user entity or the group of user entities is located in a particular geographic location of the organization.

FIG. 1 illustrates an example block diagram of a computing environment 100 in accordance with certain embodiments of the present invention. In an embodiment, computing environment 100 includes a privileged account manager system 106 communicatively connected to a client 102 via a network 104. Privileged account manager system 106 is also communicatively coupled to resources 114. While not shown in FIG. 1, privileged account manager system 106 may be communicatively coupled to resources 114 using one or more communication networks. The embodiment depicted in FIG. 1 is merely an example and is not intended to unduly limit the claimed embodiments of the present invention. One of ordinary skill in the art would recognize many variations, alternatives, and modifications.

Communication network 104 may facilitate communications and exchange of data between client 102, privileged account manager system 106 and resources 114. Communication network 104 can be of various types and can include one or more communication networks. For example, communication network 104 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as Web Sockets that provide a full-duplex communication channel over a single TCP connection, IEEE 802.XX suite of protocols, TCP/IP, IPX, SAN, AppleTalk, Bluetooth, and other protocols. In general, communication network 104 may include any communication network or infrastructure that facilitates communications between client 102, privileged account manager system 106 and resources 114.

Privileged account manager system 106 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up privileged account manager system 106 may run any operating system or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In certain embodiments, privileged account manager system 106 may be responsible for the management and access of resources by user entities of an organization. In an embodiment, privileged account manager system 106 may be configured to receive a request to create a resource group from one or more user entities of the organization. User entities may include, for example, administrative entities such as administrators of the organization. In some examples, the request may be received via client 102. Additional details of the manner in which a request may be received to privileged account manager system 106 via client 102 is discussed in detail in relation to FIG. 2.

Client 102 may include client devices, which may be of various different types, including, but not limited to, a personal computer, a desktop, a mobile or handheld device such as a laptop, a mobile phone, a tablet, etc., and other types of devices. Client 102 may also include programs or applications executing on client devices. For example, client 102 may be a web browser, a proprietary client application, or some other application executing on a client device.

Figure 3:
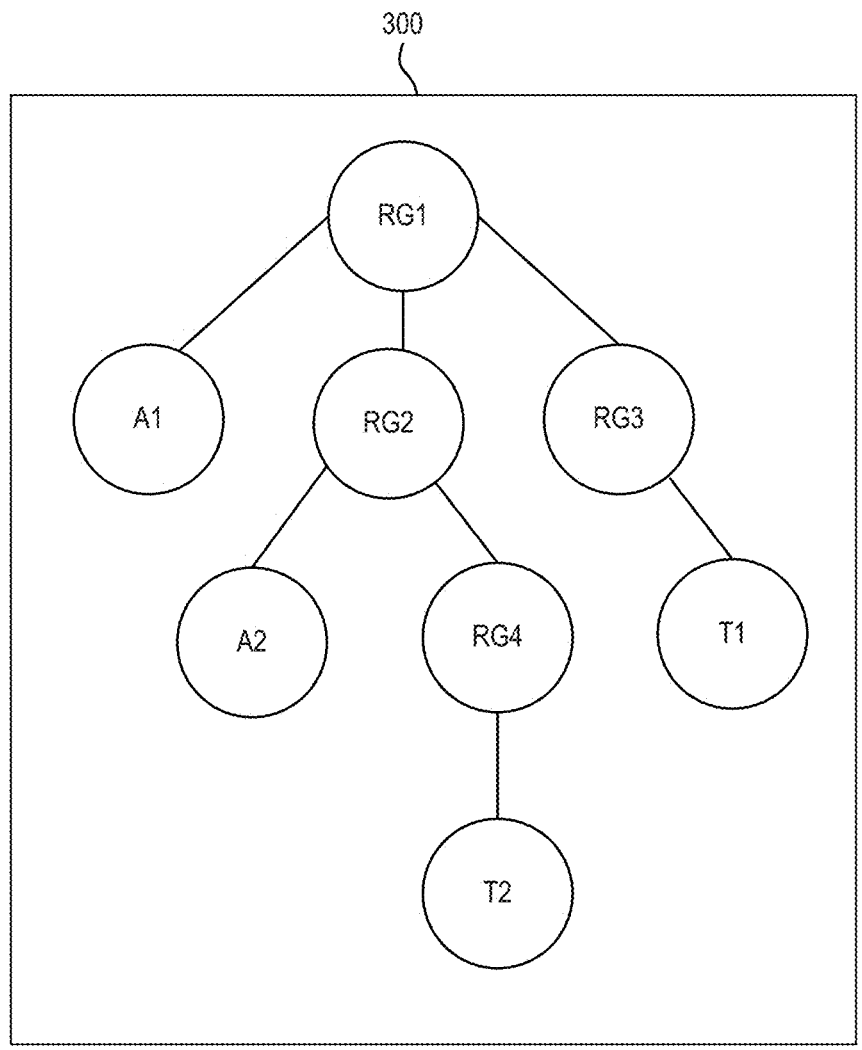
FIG. 3 is an exemplary representation of a resource group, in accordance with an embodiment of the present invention.

In some embodiments, responsive to a request from client 102, privileged account manager system 106 may be configured to enable creation of a plurality of resource groups. In an embodiment, each resource group of the plurality of resource groups may include a subset of a plurality of resources in the organization. Resources in a resource group may include accounts and target systems of the organization. In certain embodiments, resources in a resource group may also include other resource groups, which may in turn include additional accounts and target systems. In certain embodiments, the number of resources in any resource group is less than the total number of resources of the organization. An exemplary representation of a resource group is illustrated in FIG. 3.

There are various ways in which an administrator may group together resources (e.g., accounts, target systems and/or other sub-resource groups) to create a resource group. In some embodiments, the creation of resource groups by an administrator of the organization may be region-specific. For instance, an administrator may create a first resource group for a first group of administrative entities located in the west-coast of the organization such as a 'West-coast resource group,' a second resource group for a second group of administrative entities located in the east-coast of the organization, such as an 'East-Coast resource group,' and so on. Thus, west-coast entities may have access to a first set of one or more resource groups whereas east-coast entities may have access to a different set of one or more resource groups depending on their specific location.

In other embodiments, an administrator of the organization may create resource groups based on identifying different functional units of the organization. For instance, an administrator may create different resource groups such as a 'Human Resources' resource group, a 'Finance Administrator' resource group, a 'Sales' resource group and so on. Thus, entities within the human resource department of an organization may have access to a first set of one or more resource groups whereas entities in the finance department may have access to a different set of one or more resource groups. One of ordinary skill in the art would recognize many other different ways by which an administrator may create resource groups within an organization.

In some embodiments, privileged account manager system 106 may be configured to define one or more groups of administrative entities within the organization. The definition of administrative entity groups by privileged account manager system 106 may be performed in various ways. For instance, in certain embodiments, privileged account manager system 106 may be configured to define an administrative entity group by grouping together one or more administrative entities based on a specific role performed by the one or more administrative entities within the organization. For instance, privileged account manager system 106 may be configured to define a 'security' administrative entity group for one or more administrative entities having a security administrator role within the organization, a 'user manager' administrative entity group for one or more administrative entities having a management role, and so on. In the example shown in FIG. 1, the administrative entity groups include admin group-1 108, admin-group-2 110 and admin-group-3 and the resource groups include resource group 114(1), resource group 114(2) and resource group 114(N). The resource groups and administrative entity groups depicted in FIG. 1 are meant for illustrative purposes only and are not intended to limit the scope of embodiments of the present invention. Alternative embodiments may include more or fewer resource groups and administrative entity groups than those shown in FIG. 1.

In accordance with certain embodiments, privileged account manager system 106 may be configured to enable the assignment to each administrative entity (e.g., AE-1, AE2 . . . AE-N) in a first group of administrative entities, a first set of privileges on a first resource group. For instance, privileged account manager system 106 may be configured to enable the assignment to each administrative entity in admin group-1 108, a first set of privileges on a first resource group (e.g., resource group 114(1)). For example, if admin group-1 108 corresponds to a 'security' administrative entity group, then in some embodiments, privileged account manager system 106 may be configured to enable the assignment to each administrative entity (AE) in admin group-1 108, a set of security administration privileges on resource group 114(1). In a similar manner, privileged account manager system 106 may be configured to enable the assignment to each administrative entity in a second group of administrative entities (e.g., admin-group-2 110), a second set of privileges on a second resource group (e.g., resource group 114(2)). For instance, if admin group-2 110 corresponds to a 'user manager' administrative entity group then in some embodiments, privileged account manager system 106 may be configured to enable the assignment to each administrative entity (AE) in admin group-2 110, a set of user management privileges on resource group 114(2). Additional details regarding the assignment of privileges on resource groups to administrative entity groups by privileged account manager system 106 are discussed in detail in relation to FIG. 2.

In accordance with at least some embodiments, privileged account manager system 106 may be configured to enable a first administrative entity from the first group of administrative entities (e.g., admin group-1 108) to delegate a subset of the first set of privileges associated with a first resource group (e.g., resource group 114(1)) to a user entity (or a group of user entities) not in the first group of administrative entities. Upon successful delegation of the first set of privileges, privileged account manager system 106 may be configured to provide, to the user entity or the group of user entities, access to the resources in the first resource group. In some embodiments, the delegation of privileges by privileged account manager system 106 may be performed in accordance with one or more delegation policies associated with the organization. The manner in which privileged account manager system 106 may perform the delegation of privileges based on delegation policies is discussed in detail in relation to FIG. 2.

Figure 2:
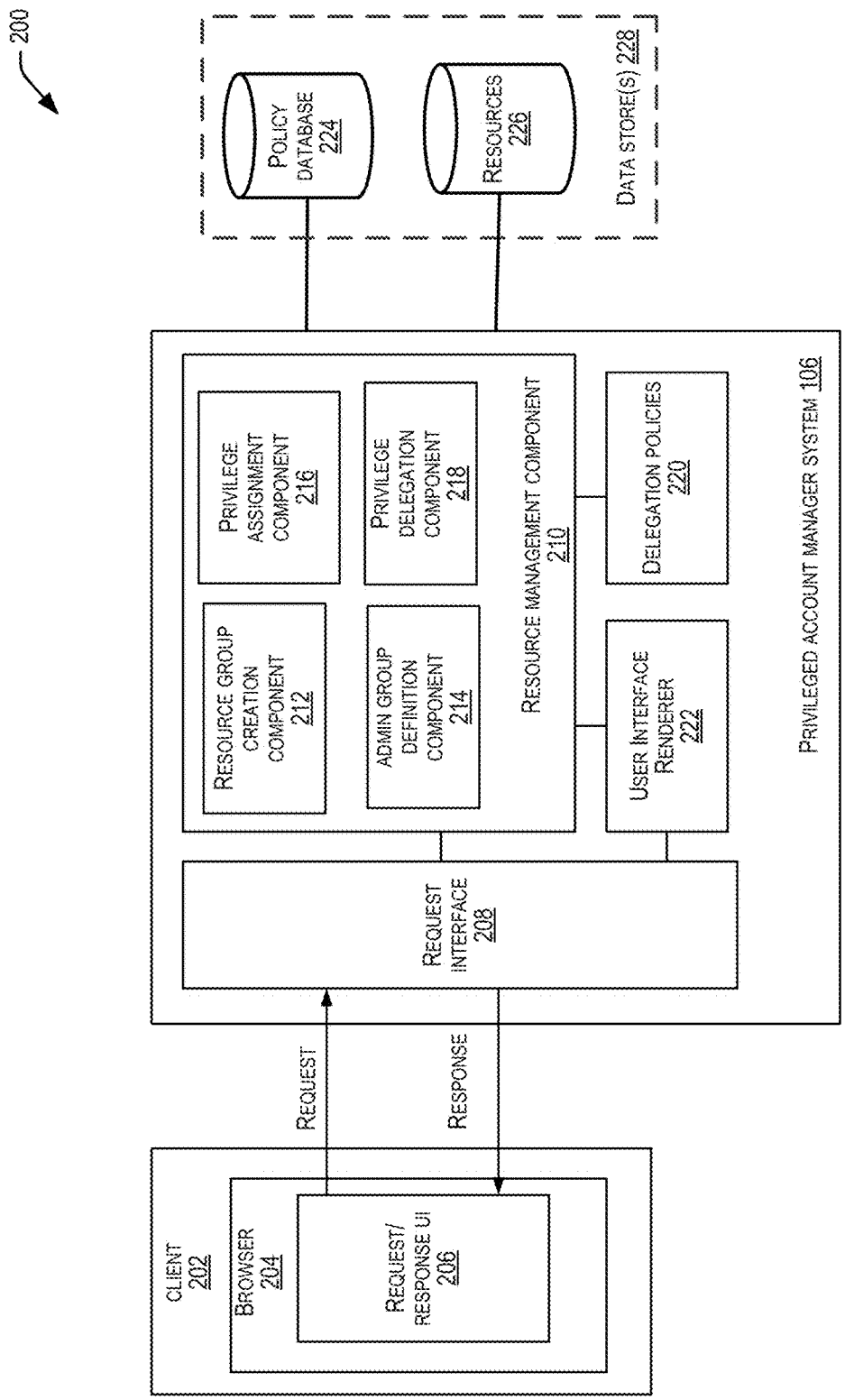
FIG. 2 illustrates an example block diagram of the privileged account manager system shown in FIG. 1, in accordance with certain embodiments of the present invention.

FIG. 2 illustrates an example block diagram 200 of the privileged account manager system 106 shown in FIG. 1, in accordance with certain embodiments of the present invention. In the embodiment depicted in FIG. 2, privileged account manager system 106 includes a resource management component 210, delegation policies 220 and a user interface renderer 222. Resource management component 210 includes a resource group creation component 212, an admin group definition component 214, a privilege assignment component 216 and a privilege delegation component 218. In an embodiment, resource group creation component 212, admin group definition component 214, privilege assignment component 216, privilege delegation component 218, delegation policies 220 and user interface renderer 222 may be implemented as general purpose computers, specialized server computers, server farms, server clusters or software components executed by one or more processors or any other appropriate arrangement and/or combination. The various components of privileged account manager system 106 depicted in FIG. 2 are meant for illustrative purposes only and are not intended to limit the scope of embodiments of the present invention. Alternative embodiments may include more or fewer components than those shown in FIG. 2.

In accordance with at least some embodiments, privileged account manager system 106 may be configured to receive a request from client 202. Client 202 may be the same or similar to client 102 shown in FIG. 1. There are various ways in which a request may be generated by a client 202. In one instance, a request may be generated as a result of a user's interactions with client 202. For example, an administrative entity such as an administrator of an organization may interact with an application executed by client 202 and the request may be generated as a result of that interaction. In some examples, the administrative entity may interact with a request/response user interface (UI) 206 in a browser application 204 executed by client 202 and the interaction may cause the browser application to generate a request that is sent to privileged account manager system 106.

In some embodiments, privileged account manager system 106 may be configured to receive a request from client 202 via a request interface 208. In some examples, request interface 208 may be implemented as a Representational State Transfer (REST) interface and the request received from the client may be formatted as a REST request.

Various types of requests may be received by privileged account manager system 106, via request interface 208, from client 202. For example, in one embodiment, privileged account manager system 106 may be configured to receive a request to create, view, modify, delete or search for a resource group from client 202. For example, in another embodiment, privileged account manager system 106 may be configured to receive a request to add, view or remove individual resources such as target systems, accounts or sub-resource groups within a resource group. In response to the request, privileged account manager system 106 may be configured to enable, for example, the creation of a resource group. In an embodiment, resource group creation component 212 within privileged account manager system 106 may be configured to enable the creation of a resource group. As noted above, in some embodiments, the members of a resource group can include target systems, accounts or other resource groups.

In other embodiments, resource group creation component 212 may also be configured to enable viewing, modifying, deletion or searching for a particular resource group by a user of client 202. In some examples, resource group creation component 212 may be configured to enable adding, viewing or removing individual resources such as target systems, accounts or sub-resource groups within a resource group by a user of client 202.

In certain embodiments, privileged account manager system 106 may provide various application progrmaming interfaces (API) to enable the creation, viewing, modification, deletion or searching of resource groups. These APIs may include for example, a create resource group API, a view resource group API, an update resource group API, a delete resource group API, a search resource group API and the like. A user entity of client 202 may use one or more of these APIs to create, view, modify, delete or search for resource groups.

In some embodiments, the creation of resource groups may be based on a geographical location of the user entities of the organization. For instance, as noted above, an administrator of the organization may create different resource groups for user entities of the organization based on the geographical locations of the user entities. For instance, a 'West-coast resource group,' may be created for user entities located in the west-coast and an East-Coast resource group,' may be created for user entities located in the east-coast and so on. Thus, west-coast users may have access to a first set of resource groups whereas east-coast users may have access to a different set of resource groups depending on their specific location.

In other embodiments, resource group creation component 212 may also enable the creation of resource groups based on identifying different functional entities within the organization. For instance, resource group creation component 212 may enable the creation of a 'Human Resources' resource group for user entities in a human resource department of an organization, a 'Finance Administrator' resource group for user entities in a finance department of the organization, a 'Sales' resource group for user entities in a sales department of the organization and so on.

In some embodiments, privileged account manager system 106 may be configured to receive a request from a user entity of client 202 to define a particular administrative entity group (e.g., a 'security' administrative group, a 'user manager' administrative group and the like) within the organization. In response to the request, privileged account manager system 106 may be configured to enable the definition of a particular administrative entity group. In an embodiment, admin group definition component 214 may be configured to enable the definition of administrative entity groups. As noted above, in some embodiments, the definition of administrative entity groups may be based on specific roles of administrative entities within the organization. For instance, admin group assignment component 214 may be configured to enable the definition of a 'security' administrative entity group for administrative entities having a security administrator role within the organization, a 'user manager' administrative entity group for administrative entities having a manager role, and so on.

In certain embodiments, privileged account manager system 106 may be configured to receive a request to assign to each administrative entity in a group of administrative entities, a set of privileges on a resource group. For instance, privileged account manager system 106 may be configured to receive a request to assign a set of security administration privileges such as the ability to show/change account passwords on one or more target systems in a resource group to administrative entities in a 'security' administrative entity group. Or, for example, privileged account manager system 106 may be configured to receive a request to assign a set of user management privileges such as the ability to grant an account in a resource group to administrative entities in a 'user manager' administrative entity group.

In response to the request, privileged account manager system 106 may be configured to perform the assignment of the set of privileges on the resource group to the administrative entity group. For instance, privilege assignment component 216 may be configured to assign a 'view' 'change' or a 'reset' privilege on a particular target system in a resource group to entities in a 'security' administrative entity group. Or, for example, privilege assignment component 216 may be configured to assign a 'grant' privilege on an account in a resource group to entities in a 'user manager' administrative entity group.

In certain embodiments, privileged account manager system 106 may be configured to receive, from an administrative entity in a first group of administrative entities, a request to delegate a subset of privileges associated with a resource group to a user entity or a group of user entities (of the organization) who is not part of the first group of administrative entities. For instance, a security administrator of a 'security' administrative entity group in an organization may wish to delegate to a user entity (who is not part of the 'security' administrative entity group), security administration privileges associated with one or more resources (e.g., LDAP server) in a resource group to enable the user entity access the LDAP server. Or, for example, privileged account manager system 106 may be configured to receive a request from a user entity such as a manager in the organization to delegate to another user entity or a group of user entities, administration privileges to grant an account associated with a resource group to the other user entity.

In response to the request, privileged account manager system 106 may be configured to enable the delegation of the privileges. In an embodiment, privilege delegation component 218 may be configured to enable the delegation of privileges. In some examples, the delegation of privileges by privilege delegation component 218 may be performed based on information related to the delegation stored in delegation policies 220. In some embodiments, the information stored in delegation policies 220 may include information about the delegator of the privilege (i.e., an administrative entity), the delegatee receiving the privilege (e.g., the user entity), the set of privileges to be delegated and any conditions applied to the delegation of the privileges. These conditions may include, for example, temporal conditions, location conditions and the like that may be applied to the delegation of privileges. For instance, privilege delegation component 218 may enable the delegation of a set of privileges associated with one or more resources (e.g., LDAP server) in a resource group to a user entity or a group of user entities for only a specific period of time each day, e.g., from 9.00 AM-5.00 PM. For instance, privilege delegation component 218 may enable the delegation of a set of privileges associated with one or more resources (e.g., LDAP server) in a resource group to a user entity or a group of user entities for a period of time that the administrative entity is away on vacation. Or, for example, privilege delegation component 218 may enable the delegation of a set of privileges associated with one or more resources (e.g., LDAP server) in a resource group to a user entity or a group of user entities only if the user entity or the group of user entities is located in a particular geographic location of the organization. The manner in which privilege delegation component 218 may enable the delegation of privileges is discussed in detail in FIG. 5.

In certain embodiments, privileged account manager system 106 may include a user interface renderer 222. User interface renderer 222 may serve as the back-end component that may be configured to implement the various user interface elements that can be rendered on browser application (e.g., 204) at client 202 to enable a user entity on client 202 to interact with privileged account manager system 106. For instance, user interface renderer 222 may be configured to render various user interfaces (UI) on client 202 such as a resource group creation UI, a resource group addition UI, a resource group viewing UI, a resource group modification UI, a resource group deletion UI, a resource group searching UI and the like. For example, user interface renderer 222 may be configured to various user interfaces (UI) on client 202 such as an add delegation UI, a delete delegation UI, a get delegation UI, a modify delegation UI and the like. In some embodiments, user interface renderer 222 may be configured to render the content of the UI in accordance with hypertext markup language such as HTML prior to transmitting the content to client 202. Client 202 may then be configured to present the UI content to a user entity via request/response UI 206 displayed in browser 204. FIG. 6 is an exemplary illustration of a user interface by which an administrative entity can view and/or modify privileges delegated to a user entity or a group of user entities.

In certain embodiments, privileged account manager system 106 may include one or more data stores 228. In some embodiments, data stores 228 may include a policy database 224 and resources 226. Policy database 224 may store a set of access policies and/or rules that specify the number and types of privileges on resources in a resource group that can be assigned to administrative entities within the organization. In some embodiments, policy database 224 may store a set of conditions such as temporal conditions, location conditions and the like that may be applied to the delegation of privileges as discussed above.

In some embodiments, resources 226 may include target systems and accounts associated with an organization. A target system may include one or more databases, lightweight directory access protocol (LDAP) servers, Active Directory (AD) systems, Email Systems, UNIX systems and the like. For example, a target system may be an Active Directory (AD) system that provides access to active directory services to access an Active Directory server. In some examples, a target system may be a computing system that provides access to a meeting room, such as access to the meeting room using a badge. In some embodiments, a target system may also be referred to as an application instance. Target systems may also include various types of software products, applications (e.g., cloud-based applications, enterprise applications, or any other applications), cloud services, various types of data (e.g., networked files, directory information, databases, or the like), and other resources.

In some embodiments, a target system may also provide resources. The resources provided by a target system may be one of various resource types, including, but not limited to, a software resource, a hardware resource, a data resource, a service, an application, a physical object, a place, a computing resource, and the like. A hardware resource may include, without limitation, servers, data storage devices, servers, printers, or the like. A software resource may include, without limitation, a computing program, an application (e.g., cloud-based applications, enterprise applications, or any other applications), a computer-program product (e.g., software), a service (e.g., cloud-based services), or the like. A data resource may include, without limitation, any accessible data objects such as a file (e.g., a networked file or directory information), a database, and the like.

In certain embodiments, an account is a resource that may be created and provisioned to user entities in an organization. In some embodiments, access to resources provided by a target system may be controlled using various types of accounts in the target system. An account may be provisioned in a target system based upon the resources provided by the target system. An account may be of various types such as user accounts, administrative accounts, application accounts, and the like, with each account type providing a particular level of access to one or more resources provided by the target system. Separate accounts (e.g., user accounts, administrative accounts, and/or application accounts) may be provided in a target system to enable a user entity (e.g., an end-user, administrator) to access or otherwise log into the target system. An account may be created, or provisioned, to a user entity or a group of users (e.g., an organization) based on the identity of the user or the group of users. A user entity or a group of users may be provided with a particular account type to access a particular resource type. For instance, an e-mail account on an Exchange server provided to a user entity may be an account of a resource type Exchange. A user entity may be given multiple accounts, each corresponding to an account type for a resource type. For example, a user entity may have two different accounts for logging into a target system to perform different types of operations. For example, a target system may host an Email exchange server and provide an email account type. The same target system may also host an HR system and provide an HR administrator account type for performing administrative functions related to the HR system. A particular user entity may have an email account on the target system and also have an HR administrative account on the target system. When logged in using the email account, the user entity may access emails. When logged in using the HR administrative account, the user entity can perform administrative tasks related to managing resources in an organization.

FIG. 3 is an exemplary representation of a resource group, in accordance with an embodiment of the present invention. In an embodiment, a resource group may be represented as a hierarchical tree of nodes 300, in which the nodes of tree 300 may represent a subset of resources of a plurality of resources associated with the organization. The resources may include various target systems, accounts and resource groups within the organization. The example shown in FIG. 3 illustrates a hierarchical tree structure 300 associated with a resource group, RG1. As shown, hierarchical tree structure 300 includes a root node, RG1 and one or more leaf nodes. For instance, the leaf nodes may include target systems T1, T2, accounts, A1, A2 and sub-resource groups RG2, RG3 and RG4. In an embodiment, a number of resources in resource group RG1 is less than the total number of resources provided by the organization. The creation of resource groups, in accordance with embodiments of the present invention enables an efficient management of resources within the organization since an administrative entity of the organization can be provided access to only a subset of resources (i.e., a resource group) of the organization and need not be provided with global administration privileges to access all the resources of the organization.

Figure 4:
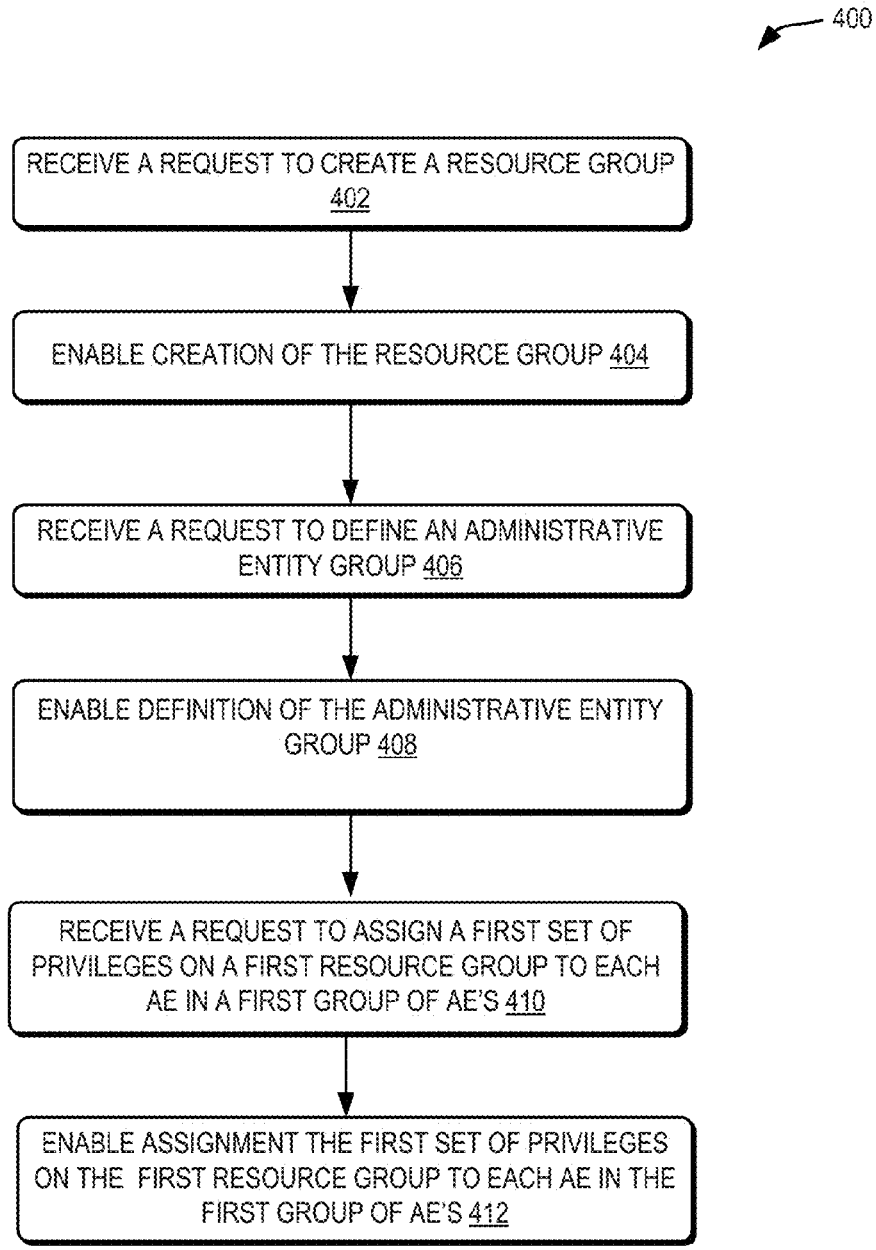
FIG. 4 illustrates a flow diagram of an example process 400 for creating resource groups.
Figure 5:
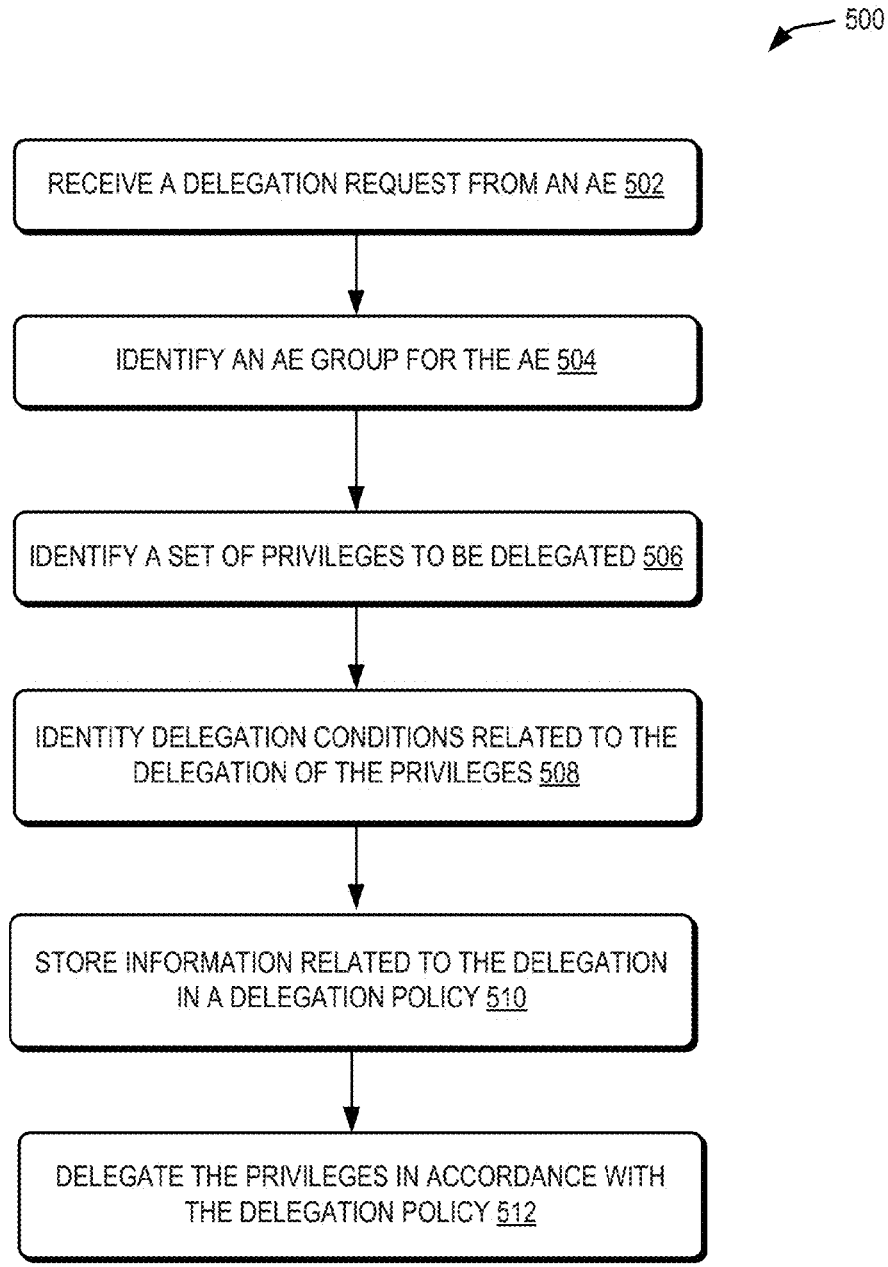
FIG. 5 illustrates a flow diagram of an example process 500 for delegating privileges associated with a resource group.

FIGS. 4-5 illustrate example flow diagrams showing respective processes 400 and 500 of managing resources of an organization according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the privileged account manager system (e.g., utilizing at least request interface 208, resource group creation component 212, admin group definition component 214, privilege assignment component 216 and privilege delegation component 218) shown in at least FIG. 2 (and others) may perform the process 400 and 500 of FIGS. 4-5 respectively.

FIG. 4 illustrates a flow diagram of an example process 400 for creating resource groups. The process at 400 may begin at 402 when a request is received by privileged account manager system (e.g., 106) from a client (e.g., 202) to create a resource group. For instance, a user entity may utilize an application on the client generate a request and the resultant request may be communicated from the client to privileged account manager system 106. At 404, the privileged account manager system may be configured to enable the creation of the resource group. In some embodiments, at 406, the privileged account manager system may be configured to receive a request from the user entity to define administrative entity group (e.g., a 'security' administrative group, a 'user manager' administrative group and the like) within the organization. At 408, the privileged account manager system may be configured to enable the definition of the administrative entity group comprising one or more administrative entities.

In some embodiments, at 410, the privileged account manager system may be configured to receive a request from the user entity to assign to each administrative entity in a group of administrative entities, a set of privileges on a resource group. For instance, as noted above, the privileged account manager system may be configured to receive a request to assign a set of security administration privileges such as the ability to show/change account passwords on a particular target system in a resource group to administrative entities in a 'security' administrative entity group. Or, for example, the privileged account manager system may be configured to receive a request to assign a set of user management privileges such as the ability to grant an account in a resource group to administrative entities in a 'user manager' administrative entity group. At 412, the privileged account manager system may be configured to enable the assignment of the set of privileges on the resource group to the administrative entity group.

FIG. 5 illustrates a flow diagram of an example process 500 for delegating privileges associated with a resource group. The process at 500 may begin at 502 when a request is received by privileged account manager system (e.g., 106) from an administrative entity on client (e.g., 202) to delegate a subset of privileges associated with a resource group to a user entity or a group of user entities who is not part of the first group of administrative entities. For instance, as noted above, a security administrator of a 'security' administrative entity group in an organization may wish to delegate to a user entity or a group of user entities (who is not part of the security' administrative entity group), security administration privileges associated with a one or more resources (e.g., LDAP server) in a resource group to enable the user entity access the LDAP server. At 504, the privileged account manager system identifies an administrative entity group associated with the administrative entity. At 506, the privileged account manager system identifies a set of privileges to be delegated. In some embodiments, at 508, the privileged account manager system identifies delegation conditions related to the delegation. For instance, as noted above, delegation conditions may include, for example, temporal conditions, location conditions and the like that may be applied to the delegation of privileges. At 510, the privileged account manager system stores information related to the delegation in a delegation policy. As noted above, the information stored in a delegation policy may include information about the delegator of the privilege (i.e., an administrative entity), the delegatee receiving the privilege (i.e., the user entity or group of user entities), the set of privileges to be delegated and any conditions applied to the delegation of the privileges. At 512, the privileged account manager system may be configured to delegate the privileges in accordance with the delegation policy and provide, to the user entity or group of user entities, access to the resources in the resource group.

FIG. 6 is an exemplary illustration of a graphical user interface (UI) provided by the privileged account manager system to enable an administrative entity to view and/or modify privileges delegated to a user entity or a group of user entities. In some embodiments, the example environment illustrated in FIG. 6 may be a graphical UI viewable via a browser application on client (e.g., 202). As shown, an administrative entity may be able to view a list of user entities and/or user entity groups who have delegated access privileges to a resource group RG1. Additionally, the administrative entity may be able to modify the delegated privileges assigned to the list of user entities and/or user entity group via the UI.

Figure 7:
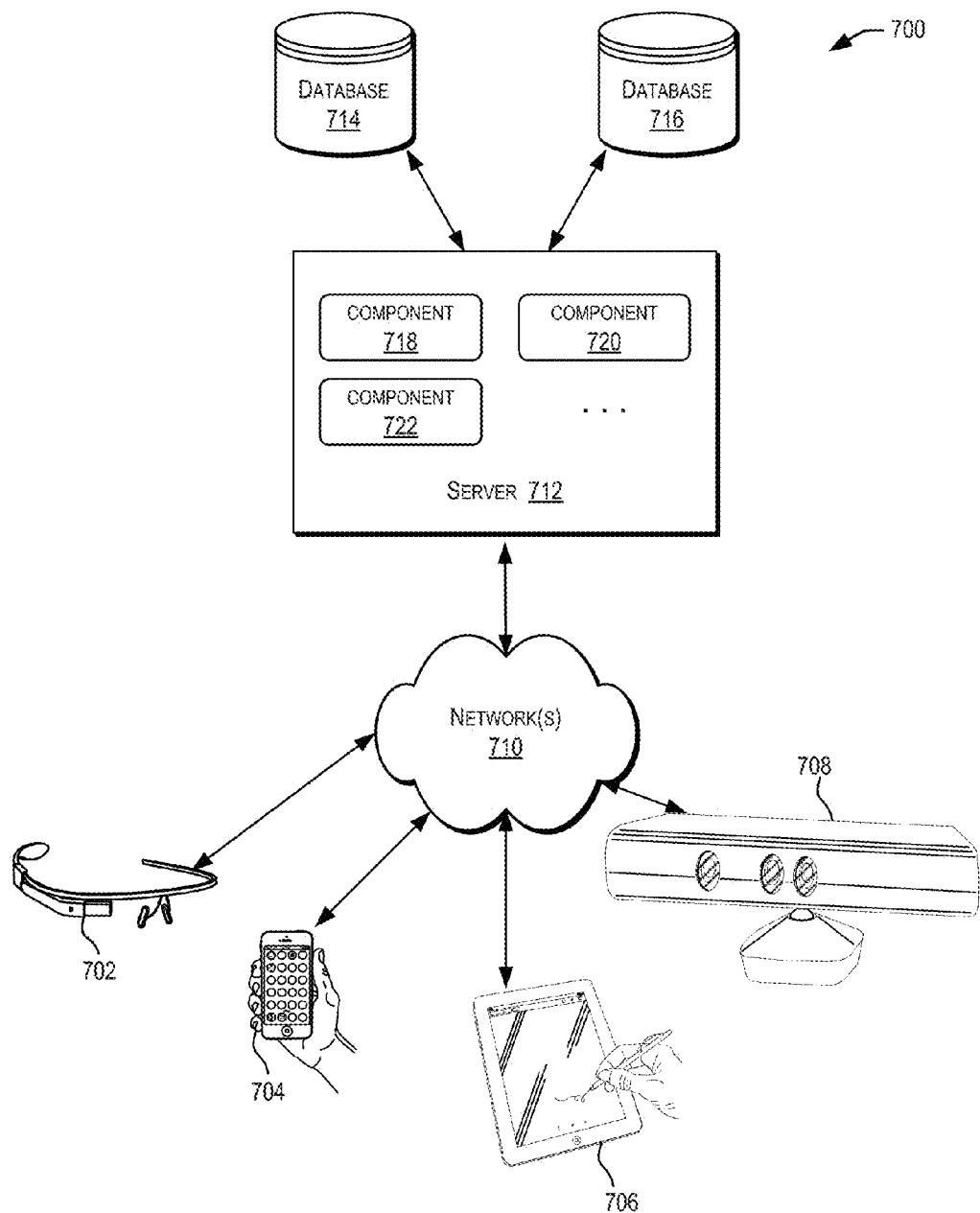
FIG. 7 depicts a simplified diagram of a distributed system 700 for implementing an embodiment of the present disclosure.
Figure 8:
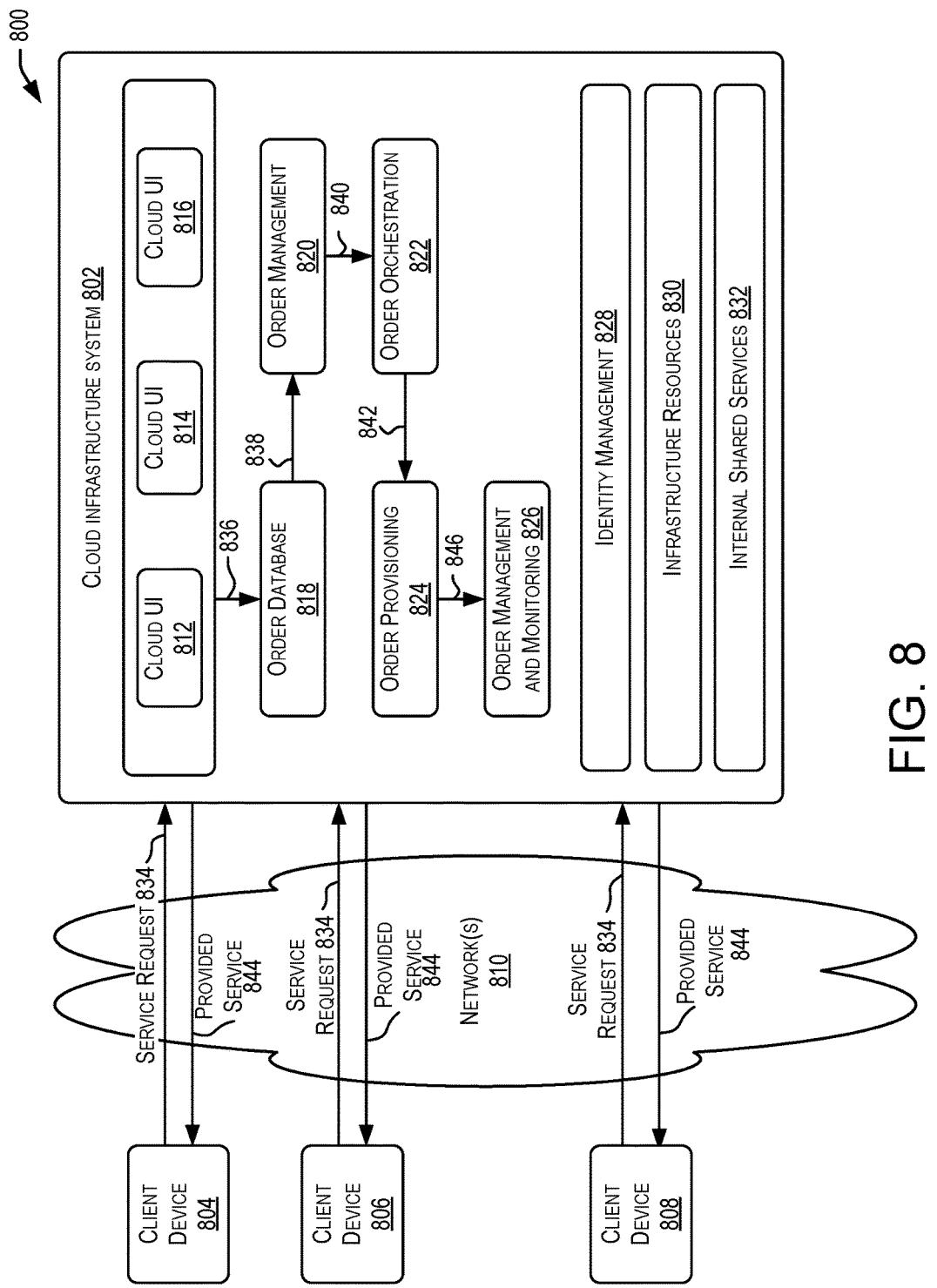
FIG. 8 is a simplified block diagram of one or more components of a system environment 800 in which services may be offered as cloud services, in accordance with an embodiment of the present disclosure.
Figure 9:
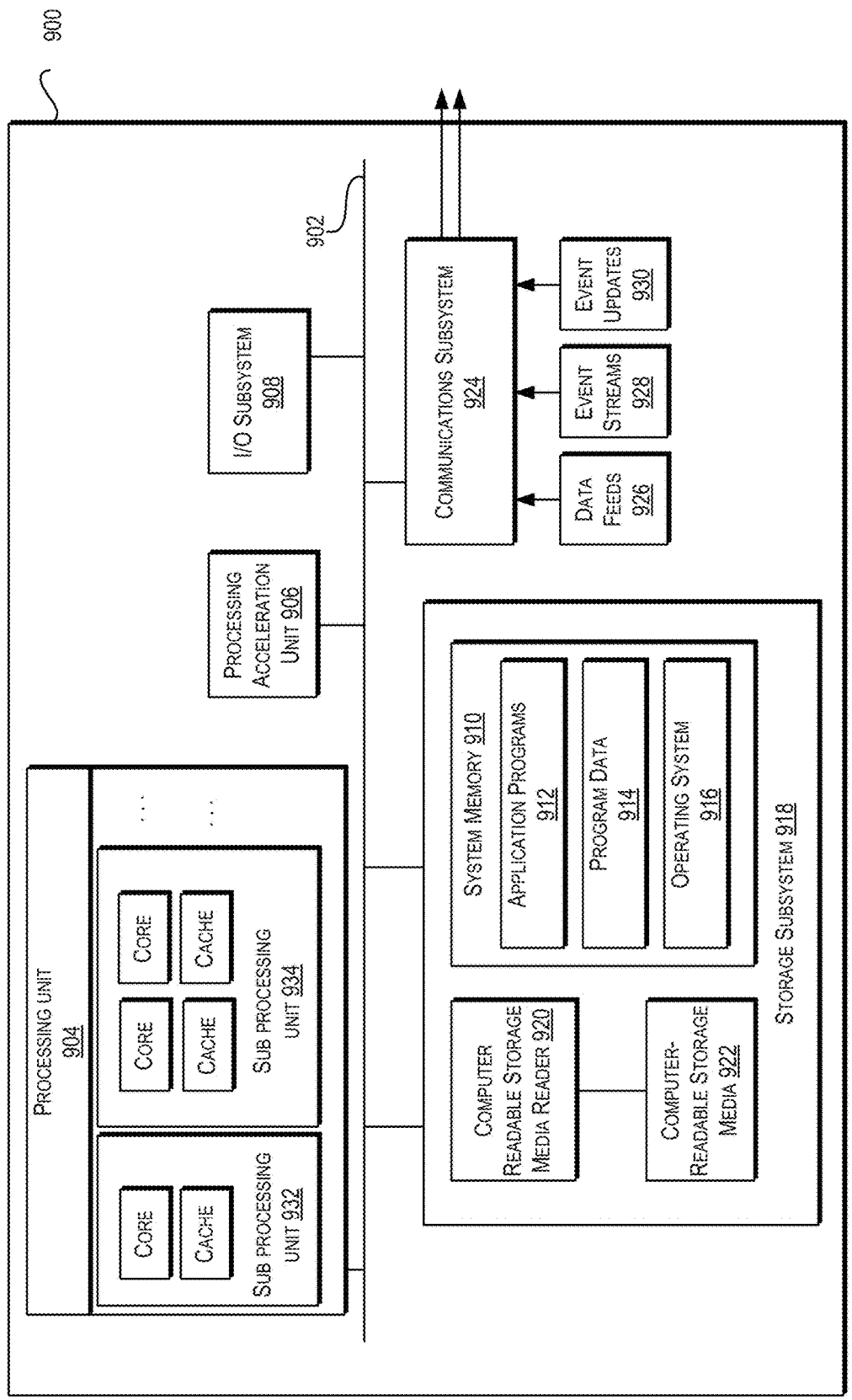
FIG. 9 illustrates an exemplary computer system 900 that may be used to implement an embodiment of the present invention.

FIGS. 7-9 illustrate aspects of example environments for implementing aspects of the present invention in accordance with various embodiments. FIG. 7 depicts a simplified diagram of a distributed system 700 for implementing an embodiment of the present disclosure. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide identity management services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 76, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as user identity information, and other information used by embodiments of the present invention. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

In some embodiments, the identity management services described above may be offered as services via a cloud environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for managing entitlements stored in target systems of an organization. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention.

In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle® Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 802 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer-readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable storage media 922 may provide storage of computer-readable instructions, data structures, program modules, and other data for computer system 900.

In certain embodiments, storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the account management system 112 depicted in FIG. 1 may receive user login information including input related to a training word from client devices using communication subsystem 924. Additionally, communication subsystem 924 may be used to communicate notifications of successful logins or notifications to re-enter a password from the account management system 112 to the requesting users.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system comprising:
a processor; and
a memory device including instructions for implementing a privileged account manager, wherein the privileged account manager manages access to resources of an organization by user entities of the organization, wherein, when executed by a processor, the instructions cause the processor to perform processing comprising:
generating a first resource group including a first subset of resources from the resources of the organization, wherein the first subset of resources includes at least one account and at least one target system of the organization, and wherein a number of resources in the first subset of resources is less than a number of the resources of the organization;
creating a first group of administrative entities from the user entities of the organization, the first group of administrative entities comprising a first administrative entity;
assigning a first set of administration privileges on the first resource group to the first group of administrative entities, the first set of administration privileges including a particular administration privilege that enables an administrative entity in the first group of administrative entities to grant an account included in the first resource group or to change a password of an account on a target system included in the first resource group;
receiving a request from a first administrative entity in the first group of administrative entities to delegate the particular administration privilege from the first set of administration privileges to a particular user entity from the user entities of the organization, wherein the particular user entity is not a member of the first group of administrative entities, and wherein the request specifies one or more conditions under which the particular administration privilege is to be delegated to the particular user entity, the one or more conditions including a temporal condition identifying a time period;
responsive to receiving the request to delegate the particular administration privilege, generating a delegation policy for delegating the particular administration privilege to the particular user entity, the delegation policy including identification of the first administrative entity, the particular user entity, the particular administration privilege, and the one or more conditions;
storing the delegation policy in a policy database;
determining, at a first point in time, that the temporal condition included in the delegation policy is satisfied;
responsive to determining that the temporal condition is satisfied, delegating the particular administration privilege to the particular user entity, wherein the delegating of the particular administration privilege by the privileged account manager to the particular user entity enables the particular user entity to grant an account included in the first resource group or to change a password of an account on a target system included in the first resource group without the particular user entity being added to the first group of administrative entities;

determining, at a second point in time after the first point in time, that the temporal condition is no longer satisfied; and responsive to determining that the temporal condition is no longer satisfied, disabling the particular user entity from using the particular administration privilege.

2. The system of claim 1, wherein the at least one account of the organization enables access to first subset of resources.

3. The system of claim 1, wherein only the first group of administration entities have administration privileges modify security settings for the first subset of resources.

4. The system of claim 1, wherein a first privilege from the first set of administration privileges enables the user entities in the first group of administrative entities to modify user entities that are able to use the first subset of resources.

5. The system of claim 1, wherein a first privilege from the first set of administration privileges enables the users in the first group of administrative entities to change the first subset of resources.

6. The system of claim 1, wherein the first set of administration privileges modifies a capability of the first group of administrative entities, wherein the capability is modified with respect to the first resource group.

7. The system of claim 1, wherein the temporal condition identifies a specific time during a day and the one or more conditions include a location condition that indicates a particular geographic location within the organization.

8. The system of claim 1, wherein:
the time period is defined by a start time and an end time;
determining at the first point in time comprises determining that the start time has been satisfied; and
determining at the second point in time comprises determining that the end time has been satisfied.

9. A computer-implemented method comprising:
generating a first resource group including a first subset of resources from resources of an organization, wherein the first subset of resources includes at least one account and at least one target system of the organization, and wherein a number of resources in the first subset of resources is less than a number of the resources of the organization;
creating a first group of administrative entities from user entities of the organization, the first group of administrative entities comprising a first administrative entity;
assigning a first set of administration privileges on the first resource group to the first group of administrative entities, the first set of administration privileges including a particular administration privilege that enables an administrative entity in the first group of administrative entities an ability to grant an account included in the first resource group or to change a password of an account on a target system included in the first resource group;
receiving a request from a first administrative entity in the first group of administrative entities to delegate the particular administration privilege from the first set of administration privileges to a particular user entity from the user entities of the organization, wherein the particular user entity is not a member of the first group of administrative entities, and wherein the request specifies one or more conditions under which the particular administration privilege is to be delegated the particular user entity, the one or more conditions including a temporal condition identifying a time period temporal conditions;
responsive to receiving the request to delegate the particular administration privilege, generating a delegation policy for delegating the particular administration privilege to the particular administrative entity, the delegation policy including identification of the first user entity, the particular user entity, the particular administration privilege, and the one or more conditions;
storing the delegation policy in a policy database;
determining, at a first point in time, that the temporal condition included in the delegation policy;
responsive to determining that the temporal condition is satisfied, delegating, at the first point in time, the particular administration privilege to the particular user entity, wherein the delegating of the particular privilege by a privileged account manager to the particular user entity enables the particular user entity to grant an account included in the first resource group or to change a password of an account on a target system included in the first resource group without the particular user entity being added to the first group of administrative entities;
determining, at a second point in time after the first point in time, that the temporal condition is no longer satisfied; and
responsive to determining that the temporal condition is no longer satisfied, disabling the particular user entity from using the particular administration privilege.

10. The computer-implemented method of claim 9, wherein the at least one account of the organization enables access to first subset of resources.

11. The computer-implemented method of claim 9, wherein only the first group of administration entities have administration privileges modify security settings for the first subset of resources.

12. The computer-implemented method of claim 9, wherein a first privilege from the first set of administration privileges enables the user entities in the first group of administrative entities to modify user entities that are able to use the first subset of resources.

13. The computer-implemented method of claim 9, wherein the first set of administration privileges modifies a capability of the first group of administrative entities, wherein the capability is modified with respect to the first resource group.

14. The computer-implemented method of claim 9, wherein
the temporal condition further comprise at least a specific time during a day and location conditions that indicate at least a particular geographic location within the organization.

15. The computer-implemented method of claim 9, wherein:
the time period is defined by a start time and an end time;
instructions for determining at the first point in time comprises determining that the start time has been satisfied; and instructions for determining at the second point in time comprises determining that the end time has been satisfied.

16. A non-transitory computer-readable media storing computer-executable instructions executable by one or more processors, the computer-executable instructions comprising:

instructions that cause the one or more processors to generate a first resource group including a first subset of resources from resources of an organization, wherein the first subset of resources includes at least one account and at least one target system of the organization, and wherein a number of resources in the first subset of resources is less than a number of the resources of the organization;

instructions that cause the one or more processors to create a first group of administrative entities from user entities of the organization, the first group of administrative entities comprising a first administrative entity;

instructions that cause the one or more processors to assign a first set of administration privileges on the first resource group to the first group of administrative entities, the first set of administration privileges including a particular administration privilege that enables an administrative entity in the first group of administrative entities an ability to grant an account included in the first resource group or to change a password of an account on a target system included in the first resource group;

instructions that cause the one or more processors to receive a request from a first administrative entity in the first group of administrative entities to delegate particular administration privilege from the first set of administration privileges to a particular user entity from the user entities of the organization, wherein the particular user entity is not a member of the first group of administrative entities, and wherein the request specifies one or more conditions under which the particular administration privilege is to be delegated to the particular user entity, the one or more conditions including a temporal condition identifying a time period;

responsive to receiving the request to delegate the particular administration privilege, instructions that cause the one or more processors to generate a delegation policy for delegating the particular administration privilege to the particular user entity, the delegation policy including identification of the first administrative entity, the particular user entity, the particular administration privilege, and the one or more conditions;

instructions that cause the one or more processors to store the delegation policy in a policy database;

instructions that cause the one or more processors to determine, at a first point in time, that the temporal condition included in the delegation policy is satisfied;

responsive to determining that the temporal condition is satisfied, instructions that cause the one or more processors to delegate the particular administration privilege to the particular user entity, wherein the delegation of the particular administration privilege by a privileged account manager to the particular user entity enables the particular user entity to grant an account included in the first resource group or to change a password of an account on a target system included in the first resource group without the particular user entity being added to the first group of administrative entities;

instructions that cause the one or more processors to determine that the temporal condition is no longer satisfied; and responsive to determining that the temporal condition is no longer satisfied, instructions that cause the one or more processors to disable the particular user entity from using the particular administration privilege.

17. The non-transitory computer-readable media of claim 16, wherein only the first group of administration entities have administration privileges to modify security settings for the first subset of resources.

18. The non-transitory computer-readable media of claim 16, wherein a first privilege from the first set of administration privileges enables the user entities in the first group of administrative entities to modify user entities that are able to use the first subset of resources.

19. The non-transitory computer-readable media of claim 16, wherein the first set of administration privileges modifies a capability of the first group of administrative entities, wherein the capability is modified with respect to the first resource group.

20. The non-transitory computer-readable media of claim 16, wherein the temporal condition further comprise at least a specific time during a day and location conditions that indicate at least a particular geographic location within the organization.

21. The non-transitory computer-readable media of claim 16, wherein:

the time period is defined by a start time and an end time;
determining at the first point in time comprises determining that the start time has been satisfied; and
determining at the second point in time comprises determining that the end time has been satisfied.

* * * * *

UNITED STATES PATENT AND TRADEMARK OFFICE
CERTIFICATE OF CORRECTION

PATENT NO. : 10,482,404 B2
APPLICATION NO. : 14/819970
DATED : November 19, 2019
INVENTOR(S) : Theebaprakasam et al.

Page 1 of 1

It is certified that error appears in the above-identified patent and that said Letters Patent is hereby corrected as shown below:

In the Specification

In Column 4, Line 64, delete "Web Sockets" and insert -- WebSockets --, therefor.

In Column 8, Line 28, delete "progrmaming" and insert -- programming --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*